Dec. 24, 1946.    T. NELSON    2,413,189
STUD WELDING MACHINE
Filed March 27, 1944    2 Sheets-Sheet 1
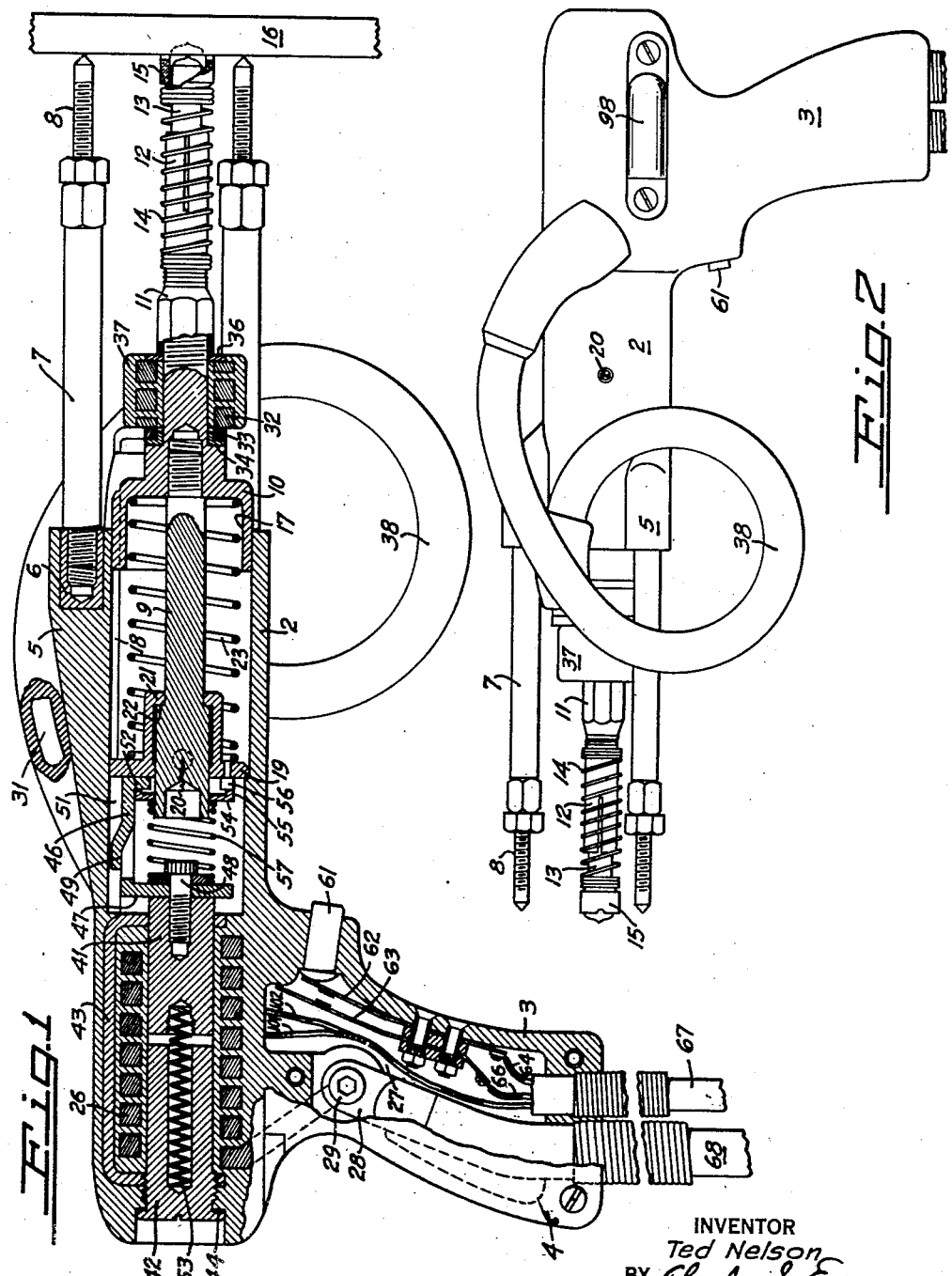
INVENTOR
Ted Nelson
BY Charles S. Evans
HIS ATTORNEY Dec. 24, 1946.　　　　T. NELSON　　　　2,413,189
STUD WELDING MACHINE
Filed March 27, 1944　　　　2 Sheets-Sheet 2

INVENTOR
*Ted Nelson*
BY *Charles S. Evans*
HIS ATTORNEY

Patented Dec. 24, 1946

2,413,189

UNITED STATES PATENT OFFICE 2,413,189

STUD WELDING MACHINE

Ted Nelson, San Leandro, Calif.

Application March 27, 1944, Serial No. 528,196

18 Claims. (Cl. 219—4)

My invention relates to welding machines and particularly to welding machines for welding studs to a base such as a wall or ceiling or floor plate.

The general object of the invention is the provision of a machine for making such welds with automatic and perfect control of the several variables which determine the soundness of the union, the most important of which are amount of separation of electrode elements, length of period of heating, the instant of physical union of the electrode elements, and the control of the arc. The result of such control is an enormous speed-up in the number of perfect welds which the operator can make in a given period.

Another object of the invention is the provision of a welding machine of such light weight and compact arrangement that it may be disposed in a cylindrical housing having a pistol grip in which the manual control is placed, so that the whole instrument somewhat resembles an automatic pistol, with characteristic ease and facility in handling.

My invention possesses other objects and features of value, some of which with the foregoing will be set forth in the following description of the invention. It is to be understood that I do not limit myself to the showing made by the said description and the drawings as I may adopt variant forms of the invention within the scope of the appended claims.

In the drawings:

Figure 1 is a partial sectional view taken in a plane lying in the main central axis. A short section of a plate to which the stud is to be welded is included; and the gun is shown in position against it. A portion of the cover plate on the grip is shown.

Figure 2 is a side elevation of the instrument, taken in a direction opposite to that of Figure 1.

Figure 3:
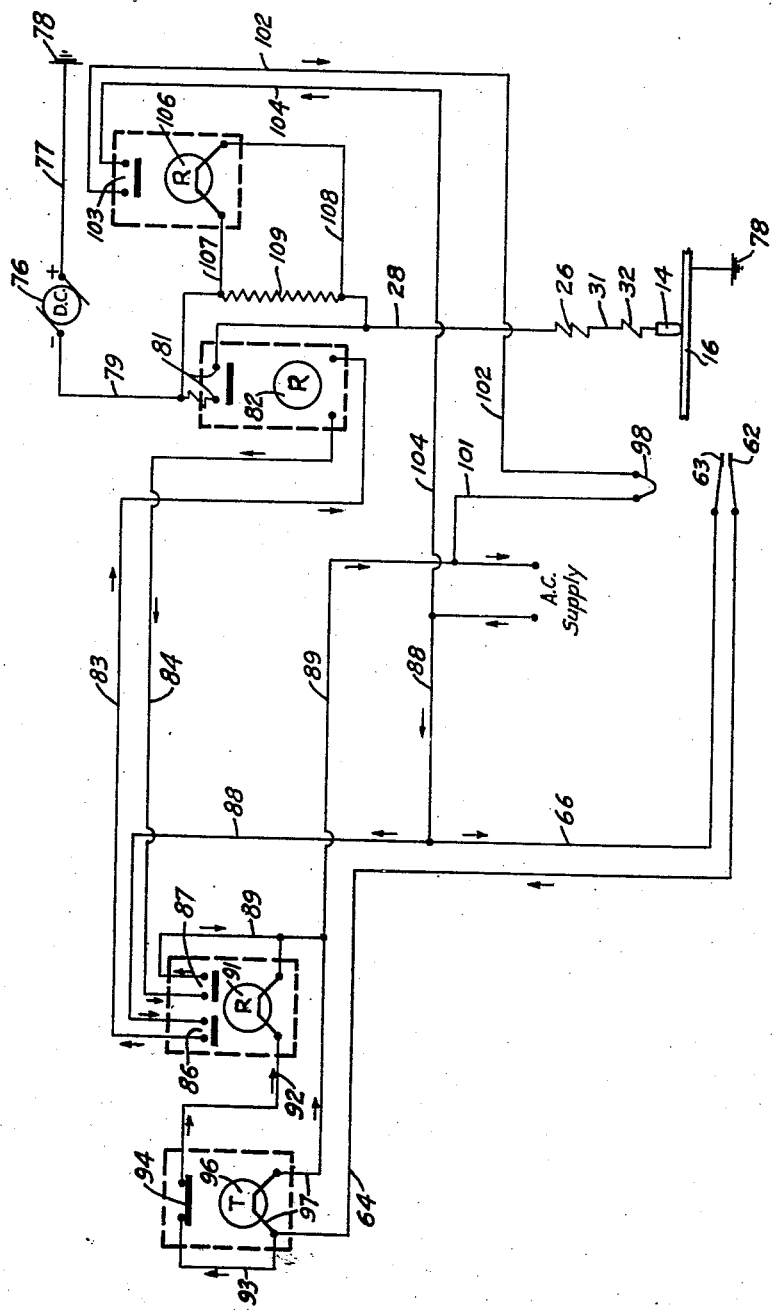
Figure 3 is a wiring diagram showing the electrical circuits and controls.

In terms of broad inclusion the welding machine or gun of my invention comprises a generally cylindrical barrel and grip of a dielectric or electrically non-conducting material, which together furnish the housing in which the operating parts and manual control are disposed. The weight and shape are not greatly different from those of a large automatic pistol, but have the advantages in manipulation and control which broadly characterize the pistol shape. The operating mechanism within the barrel portion of the housing comprises a plunger mounted for movement in the longitudinal axis of the barrel, and carrying the chuck in which the stud is held during the welding operation. An armature also movable in the longitudinal axis of the barrel and responsive to electrically energized means, is provided for drawing the plunger into the barrel to move the stud away from the plate to which it is to be fused, so that the welding arc is established. Spring means is provided for thrusting the plunger in the opposite direction to seat the heated stud, when the energizing circuit is broken. The electrically energized means includes coils of a heavy electrical conductor, embedded in the wall of the housing barrel. This is an important feature of my invention for a variety of reasons which will become apparent when the entire construction is understood. The armature carries a pick-up device or clutch mechanism, operating to seize the plunger in whatever position it lies when the stud is first seated on the plate; and then move it a predetermined distance so that the arc gap is always the same despite variations in stud and welding surface.

Coils are provided for creating a magnetic field around the welding arc so as to stabilize it; and stud, stabilizer coils and energizing coils are preferably in series connection with the conductor supplying the welding current which preferably enters the housing through the butt of the handle.

Appropriate devices outside the housing provide the welding current and make and break the welding circuit, under the control of a timer mechanism, which is put into operation by a manually operated switch or trigger arranged in the housing grip, so that by the pressure of a finger, the operation of the welding cycle may be initiated. Means are also provided for giving a visual signal to the operator, when during the positioning of a stud, physical electrical contact is made between the electrodes, and the welding cycle may be started. This signal is preferably located on the side of the housing barrel, within the field of vision of the operator.

In greater detail, my stud welding machine or gun comprises a generally cylindrical hollow barrel 2, adjacent one end of which is an integrally formed hollow hand grip 3, closed on one side by a screw-held cover plate 4. These portions comprise the housing in which the parts of the gun are arranged, and are formed of a thermo-setting type of plastic, preferably a phenol-form-aldehyde resin which is strong and light, easily made, and of high dielectric quality. The last is important from the viewpoint of safety of the operator, and because certain of the electrical conductors may be fixed in place and insulated by embedding them in the housing wall, thus achieving maximum values of space, lightness of weight, security, insulation and economy at low cost.

Extending laterally from the barrel at the end opposite the grip, are lugs 5 in which threaded metal bushings or thimbles 6 are incorporated when the gun housing is molded. Preferably three of these lugs are equispaced about the barrel, and the thimbles serve as mountings for the legs 7 which are made adjustable in length by the threaded extensions 8.

Slidably mounted in the barrel 2 of the housing is the plunger assembly, including the plunger 9, at the outer end of which is fixed the flanged collar 10, which in turn, at its outer end, is threaded to mount the chuck 11, split at its hollow outer end to form resilient jaws 12 to hold the stud 13. Thus the plunger, collar, chuck and stud are fixed rigidly together; and in the operation of the tool, reciprocate as one.

The outer surface of the chuck is formed with shallow threads or grooves to form a readily adjustable mounting for the spring 14, in the opposite end of which is carried the porcelain ferrule 15, which surrounds the end of the stud during its welding to the plate 16. The spring seats the ferrule resiliently against this plate.

The plunger 9 is held centrally in the barrel by the cylindrical flange 17, forming a sliding fit in the bore of the barrel, and prevented from rotation therein by a key fitting the keyway 18. The inner end of the plunger forms a sliding fit with the stop ring 19, fixed in the barrel against a shoulder by oppositely disposed set screws 20, one of which is indicated in Figure 1.

A flange 21 on the ring is provided, against which the shoulder 22 of the plunger seats to limit the outward movement of the plunger assembly; and this outward position is normally maintained by the heavy spring 23, which also serves to effect the recovery movement to this position of the plunger assembly after it has been retracted.

The spring 23 constitutes secondary means for moving the plunger in one direction or outwardly. Primary means are provided for moving the plunger and its connected parts in the opposite direction or inwardly. The inward movement separates the electrodes, that is, pulls the stud away from the plate or base to establish the welding arc; and the outward movement plunges the heated stud down into the heated plate to fuse them together. When the stud is loaded into the chuck, the adjustment of the parts is such as to allow the stud to project a small amount beyond the plane of the leg ends so that when placing the gun in the position of parts shown in Figure 1, the stud is pressed back from its free position, shown in the dotted lines, and is held resiliently against the plate. In a similar fashion the spring 14 is adjusted so that when the stud is seated in the position of the weld, the ferrule is also held resiliently against the plate.

Embedded in the inwardly thickened wall of the housing at the grip end are the coils 26 of a solenoid. One end of the coil terminates in a connector socket within the grip chamber 27, and to which the end of the welding current conductor 28 is fixed by the screw 29. The other end terminates in a connector socket on the outside of the barrel, and to which the end of the conductor 31 is fixed.

The other end of the conductor 31 is connected through the stabilizer coils 32 to the chuck, so that solenoid coils 26, stabilizer coils 32, chuck and stud are electrically connected in series. Connection through the stabilizer coils is secured by terminating the conductor 31 in an eye 33, held tightly between a fiber washer 34 and the first coil 32 by the engagement of the chuck against a steel washer 36, brazed to the last coil 32. The coils 32, except the two end surfaces left for contact, are embedded in and insulated by a thermo-setting resin 37; and of course the conductor 31 is also heavily insulated. Because the end of the conductor must move back and forth with the plunger assembly, the conductor is given one complete loop 38 to give flexibility to the whole.

The welding current through the stabilizer coils 32 generates a powerful magnetic field about the welding arc, tending to confine and stabilize the arc at the location of the weld, and preventing spattering and waste of the molten metal.

Slidably mounted in approximately the inner half of the thickened housing wall containing the solenoid coils, is a core or armature 41, the movement of which into the coils (to the left of Figure 1) is determined by the fixed core 42. This has a threaded engagement in the housing wall and in the yoke shaped steel reinforcing tie 43, which ties the wall in which the solenoid coils are embedded into a mechanically strong block able to resist the stresses placed thereon in the operation of the gun. Movement of the armature under the influence of the energized solenoid coils determines the distance the stud is moved to draw the welding arc; and since this distance is a predetermined value, the position of the fixed core may be varied by the use of shims 44 under the head of the fixed core. It will be observed that the fixed core becomes a powerful magnet when the coils are energized, so that when the armature is stopped by it, the armature is strongly held in the retracted position, until the current is interrupted.

Clutch means are provided for connecting the armature to the plunger assembly for movement together as one, when the armature moves under the influence of the magnetic field created by the coils, and for maintaining this connection so long as there is any stress tending to separate the two. This clutch connection however is released and the parts are free of each other when the armature moves in the other direction; that is, toward the plunger assembly, or the plunger assembly is moved inwardly of the housing and toward the armature. The latter happens when a stud is set in position to be welded. As already mentioned the adjustment of the three legs is preferably such as to allow the stud to extend somewhat beyond them, so that the plunger assembly is pushed slightly back into the barrel against the resistance of the spring 23, when the stud is in position and the three legs seated to insure perpendicularity of the stud. During this movement of the plunger assembly, which varies with variations in the stud and in the surface to which the stud is to be welded, the assembly is free of the armature, but with the power movement of the armature, the clutch acts instantly to engage the plunger, so that the entire plunger assembly including the stud is retracted against the resistance of the spring 23, the exact amount of the armature movement. This is always the same for a given setting of the fixed core. Thus irrespective of variations in stud or the plate to which it is to be welded, the stud is always retracted the same predetermined distance determined by the fixed core setting. This distance is of course the one best suited for the arc required for the stud used.

The clutch means required for this duty comprises a link 46, disposed longitudinally of the barrel and against the upper wall thereof, and having a flange 47 rigidly fixed by the screw 48 to the end of the armature. A tongue 49, pressed out of the link forms a key which, engaging in the keyway 51 formed in the barrel, prevents transverse movement of the link while permitting its rectilinear movement back and forth with the armature.

The free end of the link is provided with a short hook flange 52, which engages the fixed stop ring 19 to limit the recovery movement of the armature after its power stroke. A spring 53 interposed between the fixed core and the armature in aligned axial recesses tends to return the armature and link to the recovered position as shown in Figure 1. The air pocket formed between the core and armature may be ignored, since the volume changes but little due to the central recesses, and passage of air occurs past the armature. The hook flange 52 has another important function. It is hooked over one side of the clutch ring 54 surrounding the inner end of the plunger. The clutch ring is so sized and proportioned that when it is perpendicular to the plunger there is no engagement; and plunger and clutch ring may be freely moved relative one to the other. A diameter of plunger about .003 of an inch less than the diameter of the hole in the clutch ring gives a satisfactory result. To prevent flexure in the ring, it is preferably provided with a short peripheral flange 55.

Tipping the clutch ring out of perpendicularity with the plunger causes an instant seizure of the plunger by the ring. A boss 56 in the stop ring, on the opposite side from the hook 52, supports the clutch ring in the inactive or non-seizing position, into which it is resiliently pressed by the coil spring 57, the end coils of which are disposed about the heads of the plunger and screw 48. The inner end of the plunger head is recessed as shown, both for lightness and to receive the projecting head of the screw 48 upon the extreme movement of the plunger.

From the foregoing it will be clear that both retracting and extending movement of the plunger assembly may occur without disturbing the perpendicularity of the clutch ring to the cylindrical plunger head which it encircles, but that the least power move of the armature and link tips the clutch ring to seize the plunger, which then moves with the armature and against the spring 23, to the end of the armature movement where it is held until the circuit is broken, whereupon spring 23 effects the rapid recovery movement of the plunger assembly, spring 53 effects the recovery of the armature and link, and spring 57 presses the clutch ring back into its inactive or free perpendicular position against the hook 52 and boss 56.

Thus irrespective of the position of the plunger when the gun has been placed to make a weld and with the stud pressing against the plate, operation of the solenoid and clutch results in seizing the plunger assembly and retracting it the fixed predetermined distance traveled by the armature, the energizing current passing in series through the solenoid coils 26, conductor 31, stabilizer coils 32, chuck, and stud. Since the stud is in physical contact with the plate when the circuit is first established, the flow is at first directly from plate to stud. With the action of the solenoid however the stud is lifted or retracted from the plate to establish the welding arc and thereafter until the circuit is broken the current jumps the gap between stud and plate heating both to the degree required for fusing. Upon the breaking of the circuit through the solenoid coils, the plunger assembly is released; and the spring 23 effects its recovery movement, plunging the stud into the heat softened area on the plate. The fused material cools almost instantly, at which time the gun is pulled free, leaving the stud welded in place.

Manually operated means in the grip portion of the gun housing are provided for initiating the welding cycle of operations. After the initial setting of the spark gap interval (determination of armature travel by setting the fixed core) which need be changed only when change of size of stud requires a different spark gap, loading the chuck with a stud, placing the stud on the mark where it is to be welded, and pressing the trigger is all that is required for a perfect weld.

Disposed in the grip of the housing in a position conveniently under a finger is a trigger, preferably a push button 61, bearing at its inner end against the spring switch arm 62, which is spaced a short distance from the spring switch arm 63. These arms are insulated from each other; and form the terminals of the conductors 64 and 66 respectively, carried in a flexible conduit 67 of convenient length to the stationary electrical devices which effect and control the operation of my gun. The conduit 67 enters the butt end of the grip along with the conduit 68 carrying the welding current conductor. This arrangement together with the placing of the solenoid coils well back in the "breach" of the barrel, and the placing and proportions of the other parts, contributes heavily to the balance of the gun in the hand of the welder.

While my gun is relatively light in weight when compared to previously known welding tools, it is of very great importance to the operator after a few hours of use, whether the instrument balances easily in the hand, or whether a muscular effort is required to position the gun in addition to the necessary overall support. My gun has been designed to insure balance about the grip; and this is directly reflected in the number of studs which can be welded by an operator after the first few hours of the day.

The remote controls and connecting circuits of my tool are shown in diagram in Figure 3. The control devices are standardized and well known and only the circuits which I prefer to use require detailed explanation.

The welding current is derived from a direct current generator 76, having a conductor 77 for grounding its positive side on the plate or wall 78 to which the studs are to be welded. The negative side of the generator is connected by conductor 79 to one pole of the switch 81, the other pole being connected by conductor 28 running through conduit 68 to the gun.

The welding current control switch 81, which is normally open is operated by the relay 82, supplied by the conductors 83 and 84, connected through the normally open twin switches 86 and 87 with the conductors 88 and 89 respectively, connected in turn to a source of A. C. current. The twin switches 86 and 87 are operated by the relay 91 in the circuit including the conductors 92 and 93 connected by the normally closed switch 94, which is controlled by the timer 96. The conductor 93 is fed from the conductor 64 extending to the terminal 62 of the trigger switch, as also is the conductor 97 which supplies the timer. The other terminal 63 of the trigger switch is supplied by the conductor 66, connected to the conductor 88.

Means are provided for indicating to the operator while positioning the stud the establishing of electrical contact between stud and plate; and this is preferably done by a red neon light 98 disposed on the side of the gun and which glows when the circuit is completed. The lamp is supplied by conductors 101 and 102, the lamp ends of which are carried into the gun through the conduit 67. The other end of conductor 101 is connected to conductor 89; and the other end of conductor 102 terminates in one pole of the switch 103, the other pole of which is connected to conductor 88 by conductor 104.

The switch 103 which is normally open, is closed by the relay 106, supplied by conductors 107 and 108 in parallel with a resistance 109, shunted around the switch 81. Both relay windings and resistance are calculated to pass only a fraction of the available direct current, as only the operation of the relay 106 to close the switch 103 in the neon lamp circuit, is desired when the stud closes the circuit through the ground, thus indicating that the closing of the trigger switch will start the flow of the full volume of welding current.

The instant the trigger switch is closed, the relay 91 closes the twin switches 86 and 87 to supply the relay 82, which then closes the switch 81, permitting the full direct current to flow through the welding circuit. This, it will be recalled, energizes the solenoid coils 26, and pulls the stud away from the plate to establish the welding arc. Simultaneously with the energizing of the relay 91, the timer 96 starts its predetermined timed cycle, at the end of which it opens the switch 94, thus allowing the twin switches 86 and 87 to open, which in turn cause the opening of the switch 81 in the welding circuit, ending the arc and releasing the plunger assembly from the pull of the solenoid so that the stud is seated against the plate by action of the spring 23.

With the generator running and the location in which the studs are to be welded easily accessible, a welder can easily load with stud and ferrule, position the stud, press and release the trigger, pause, and then pull the gun chuck free of the perfectly welded stud in ten seconds or less, and can maintain a rate of 250 to 300 welded studs an hour. Positions reached with difficulty, or bent or other special studs will of course slow up production.

I claim:

1. A stud welding machine comprising a housing, a plunger slidably arranged in the housing, means on the plunger for holding a stud, primary means for moving the plunger in one direction, secondary means for moving the plunger in the other direction, means interposed between the plunger and primary means for seizing the plunger when the primary means is actuated, and means located between the plunger and primary means for releasing the plunger when the plunger is moved by the secondary means.

2. A stud welding machine comprising a housing, a plunger slidably arranged in the housing, means on the plunger for holding a stud, an electrically operated armature for moving the plunger in one direction, a spring for moving the plunger in the opposite direction, clutch means between the armature and plunger for seizing the plunger when the armature is actuated, and a spring carried by the armature and plunger for releasing the clutch means when the plunger is moved by the first-named spring.

3. A stud welding machine comprising a cylindrical housing, a plunger slidably arranged in the housing and substantially coaxial with the long axis thereof, means on the plunger for holding a stud substantially coaxial with the plunger, primary means for moving the plunger in one direction, secondary means for moving the plunger in the other direction, and mechanism including a spring pressed clutch ring, interposed between the plunger and the primary means for seizing the plunger when the primary means is actuated and for releasing the plunger when the plunger is moved by the secondary means.

4. A stud welding machine comprising a housing, a plunger slidably arranged in the housing, means on the plunger for holding a stud, a solenoid core slidable in the housing, an energizing coil surrounding the core, clutch means between the core and plunger for seizing the plunger when the core is moved in one direction by the energized coil, a spring for moving the plunger in the other direction, and means on the solenoid core for releasing the clutch means when the plunger is moved by the spring.

5. A stud welding machine comprising a housing, a plunger slidably arranged in the housing, means on the plunger for holding a stud, a solenoid core slidable in the housing, an energizing coil surrounding the core, a ring slidable on the plunger when normal to the plunger axis and engaging the plunger when tipped from the normal position, means pressing the ring into normal position, means connecting the core to one side of the ring whereby movement of the core by the energized coil tips the ring and moves the plunger in one direction, and a spring for moving the plunger in the other direction.

6. A stud welding machine comprising a housing, a plunger slidably arranged in the housing, means on the plunger for holding a stud, a plunger-moving spring interposed between plunger and housing, a clutch ring on the plunger and engaging the plunger when tipped from normal position, means normally retaining the clutch ring in disengaged position, a link engaging one side of the clutch ring to tip it from normal position when the link is moved, and electrically actuated means for moving the link to move the plunger to compress the spring.

7. A stud welding machine comprising an electrically non-conducting housing, a plunger slidably arranged in the housing, means on the plunger for holding a stud, a plunger-moving spring interposed between plunger and housing, a clutch ring on the plunger, means normally retaining the clutch ring in disengaged position, an armature, a link connecting the armature to one side of the clutch ring, and an electric conductor disposed to energize the armature and embedded in the wall of the housing.

8. A stud welding machine comprising an electrically non-conducting housing, a plunger slidably arranged in the housing, means on the plunger for holding a stud, a plunger-moving spring interposed between plunger and housing, an armature slidably arranged in the housing, a core adjustable to limit movement of the armature, coils of an electric conductor embedded in the housing around the armature and core, and a clutch for connecting the armature and plunger.

9. A stud welding machine comprising a generally cylindrical housing of electrically non-conducting material, a plunger slidably arranged in the housing, means on the plunger for holding a stud, a spring interposed between plunger and housing for moving the plunger in one direction, an armature slidably arranged in the housing, an electric conductor embedded in the wall of the housing to energize the armature to move in the opposite direction, and means for connecting the armature and plunger.

10. A stud welding machine comprising a generally cylindrical housing of electrically non-conducting material, a plunger slidably arranged in the housing, means on the plunger for holding a stud, a spring interposed between plunger and housing for moving the plunger in one direction, an armature slidably arranged in the housing, an electric conductor embedded in the wall of the housing to energize the armature to move in the opposite direction, means for connecting the armature and plunger, and an electric conductor about the stud-holding means and in series with the conductor embedded in the housing wall.

11. A stud welding machine comprising a housing of dielectric material, coils of an electric conductor embedded in the housing wall at one end, a plunger slidably arranged at the other end, means on the plunger for holding a stud, an armature energized by the coils and slidably arranged in the housing, means operating to connect the plunger and armature when the latter moves in one direction, and a spring compressed by such movement for moving the plunger in the opposite direction.

12. A stud welding machine comprising a housing of dielectric material, coils of an electric conductor embedded in the housing wall at one end, a plunger slidably arranged at the other end, means on the plunger for holding a stud, an armature energized by the coils and slidably arranged in the housing, means for connecting the plunger and armature when the latter moves in one direction, a spring compressed by such movement for moving the plunger in the opposite direction, and a plurality of coils of an electric conductor about the stud holding means and in series with the conductor embedded in the housing wall.

13. A stud welding machine comprising a housing, a plunger slidably arranged in the housing, means on the plunger for holding a stud, a spring interposed between the plunger and housing for moving the plunger in one direction, electro-magnetic means including coils of an electric conductor arranged in the housing to move the plunger in the opposite direction, a plurality of coils of an electric conductor about the stud holding means and in series with the coils of the electro-magnetic means, and means for supplying an electric current to the coils.

14. In a machine for welding a stud to a plate, a housing of dielectric material, and electro-magnetic means for moving the stud away from the plate to establish the welding arc and including coils of an electric conductor embedded in the wall of the housing.

15. In a machine for welding a stud to a plate, a housing, stud holding means carried by the housing, electro-magnetic means for moving the stud holding means to establish the welding arc between stud and plate, and arc stabilizing means including a plurality of coils of an electric conductor arranged on the machine adjacent the stud and connected in series with the electromagnetic means, and means for energizing the electro-magnetic means and coils.

16. A stud welding machine comprising a hollow generally cylindrical housing of dielectric material, a metal coil embedded in the wall of the housing adjacent one end thereof and forming both an electric conductor constituting the coil of a solenoid and a mechanical reenforcement for the wall, the wall constituting insulating and mounting means for the coil, a solenoid core slidable within the coil, an adjustable stop for limiting the travel of the solenoid core, a plunger slidably arranged in the housing at the end opposite the solenoid coil, means on the plunger for holding a stud, and means disposed between the solenoid core and plunger for connecting the two for coextensive movement as one when the solenoid is energized to move the core and for releasing the plunger from the solenoid core when the solenoid is deenergized.

17. A stud welding machine comprising a hollow generally cylindrical housing of dielectric material, a metal coil embedded in the wall of the housing adjacent one end thereof and forming both an electric conductor constituting the coil of a solenoid and a mechanical reenforcement for the wall, the wall constituting insulating and mounting means for the coil, a solenoid core slidable within the coil, a plunger slidably arranged in the housing at the end opposite the solenoid coil, means on the plunger for holding a stud, means for connecting the solenoid core and plunger when the core moves in one direction, and a spring compressed by such movement for moving the plunger in the opposite direction.

18. A stud welding machine comprising a hollow generally cylindrical housing of dielectric material, a metal coil embedded in the wall of the housing adjacent one end thereof and forming both an electric conductor constituting the coil of a solenoid and a mechanical reenforcement for the wall, the wall constituting insulating and mounting means for the coil, a solenoid core slidable within the coil, a plunger slidably arranged in the housing at the end opposite the solenoid coil, means on the plunger for holding a stud, said solenoid coil and core and said plunger and stud holding means being in axial alignment and coaxial with said cylindrical housing, and means for connecting the solenoid core and plunger when the core moves in one direction.

TED NELSON.